United States Patent [19]
Miyaki

[11] 3,950,516
[45] Apr. 13, 1976

[54] PROCESS FOR PREPARING CIRRAMYCIN $A_1$

[75] Inventor: Takeo Miyaki, Yokohama, Japan

[73] Assignee: Bristol-Myers Company, New York, N.Y.

[22] Filed: Nov. 18, 1971

[21] Appl. No.: 201,597

[52] U.S. Cl. .............................................. 424/123
[51] Int. Cl.² ........................................ A61K 35/00
[58] Field of Search .................................. 424/123

[56] References Cited
UNITED STATES PATENTS
3,159,540  12/1964  Kawaguchi et al. ................ 424/114

OTHER PUBLICATIONS

The Merck Index, 7th ed., 1960, Merck & Co., Inc., Rahway, N.J., p. 160.

Primary Examiner—Stanley J. Friedman
Attorney, Agent, or Firm—James Magee, Jr.

[57] ABSTRACT

The specification discloses a process for preparing cirramycin $A_1$ which comprises fermentation of cirramycin $B_1$ and subsequent conversion thereof to cirramycin $A_1$ by incubation in the presence of cane molasses.

4 Claims, No Drawings

PROCESS FOR PREPARING CIRRAMYCIN $A_1$

BACKGROUND OF THE INVENTION

This invention is directed to antibiotics and, more particularly, to a process for preparing an antibiotic known as cirramycin $A_1$. Another aspect of the invention is a thermo-stable incubation substrate for the conversion of cirramycin $B_1$ to cirramycin $A_1$.

The antibiotic known as cirramycin and its preparation is disclosed in U.S. Pat. No. 3,159,540. This antibiotic which comprises components identified as cirramycin A and cirramycin B can be prepared by fermentation with an organism designated *Streptomyces cirratus* (ATCC 14699). It has been found that the antibiotic cirramycin contains not only A and B components, but can also be separated into a series of components designated as $B_1$, $B_2$, $B_3$, $A_1$, $A_2$, $A_3$, $A_4$, and $A_5$.

It is also known that mild acid hydrolysis, with 0.1 normal hydrochloric acid, of cirramycin $B_1$ gives cirramycin $A_1$. See T. Suzuki, "Bull. Chem. Soc.," Japan, 43, 292 (1970). Conversion by this method is not satisfactory, because it is characterized by significant loss of biological activity and very low yields.

However, it has now been discovered that high yields of high-activity cirramycin $A_1$ can be obtained in good yields by incubating cirramycin $B_1$ in a substrate comprising an aqueous solution of cane molasses. Good yields of cirramycin $A_1$ can be achieved by this process which comprises admixing cirramycin $A_1$ with a solution of cane molasses and incubating the admixture until a suitable degree of conversion is achieved. The conversion of $B_1$ to $A_1$ can be followed by periodically withdrawing and assaying samples.

Although the amount of cane molasses in the substrate is not narrowly critical, it is generally preferred to employ an aqueous solution of relatively low molasses concentration as a substrate for the incubation. For example, a concentration of about 2 percent cane molasses has been found to provide good yields of high activity cirramycin $A_1$ when used as a substrate in connection with an incubation of cirramycin $B_1$ at about 37° C. It will be appreciated that variations in the concentration of cirramycin $B_1$ being incubated may give rise to variations in the substrate concentration for optimum results.

In practice, the process of this invention comprises the steps of preparing cirramycin $B_1$ by fermentation of a suitable strain of *Streptomyces cirratus*. It is preferred that a strain capable of producing high yields of cirramycin $B_1$ be utilized in conjunction with standard fermentation techniques. The cirramycin $B_1$ is then extracted from the fermentation broth by solvent separation procedures to provide an aqueous extract containing the cirramycin $B_1$.

In practice, the cirramycin $B_1$ can be further separated from the aqueous extract and used as a solid, or the cirramycin $B_1$-containing extract can be added directly to the cane molasses substrate and incubated. After completion of the conversion, cirramycin $A_1$ can be recovered by solvent extraction. Minor components which are not converted to $A_1$ are taken into an organic solvent phase, and cirramycin $A_1$ is recovered from the aqueous phases and can be, if desired, further purified by countercurrent distribution.

EXAMPLE 1

Flask Fermentation of Cirramycin $B_1$

Oatmeal agar slants were seeded with *Streptomyces cirratus*, ATCC 21731. The slants were incubated for two weeks at 28° C. and then used to prepare seed culture flasks by inoculating 100 ml. of a germination medium having the following composition in 500-ml. Erlenmeyer flasks.

| | |
|---|---|
| Potato Starch | 2.0% |
| Corn Steep Liquor | 1.5% |
| Soybean Meal | 2.0% |
| $K_2HPO_4$ | 1.0% |
| $NaNO_3$ | 0.5% |
| pH 7.0 before sterilization | |

The seed culture flasks were then incubated at 28° C. for two days on a rotary shaker.

A 2% (V/V) transfer of the seed culture was made to 500-ml flasks containing 100 ml. of fermentation medium having the following composition.

| | |
|---|---|
| Oat Meal | 6.0% |
| Pharma Media | 0.8% |
| Meat Extract | 2.0% |
| $FeSO_4.7H_2O$ | 0.05% |
| $ZnSO_4.7H_2O$ | 0.05% |
| $CaCO_3$ | 0.1% |
| pH 7.0 before sterilization | |

The fermentation flasks were incubated at 28° C. for three to five days on a rotary shaker operating at 250 r.p.m. Progress of the fermentation process is shown below.

| days | pH of broth | broth potency |
|---|---|---|
| 1 | 6.3 | 100 mcg./ml. |
| 2 | 7.2 | 168 |
| 3 | 5.4 | 172 |
| 4 | 6.5 | 238 |
| 5 | 5.8 | 142 |

EXAMPLE 2

Tank Fermentation of Cirramycin $B_1$

One liter of seed culture of *Streptomyces cirratus*, ATCC 21731, shaken for 48 hours in Erlenmeyer flasks, was used to inoculate 120 L. of the germination medium (same composition as for Example 1 seed culture) in 200 L. tank. The seed tank was stirred at 28° C. and at 200 r.p.m. with aeration rate of 100 L./min. The 24 hours' seed culture (ph 6.9) was then inoculated to 1,350 L. of fermentation medium (same composition as for Example 1 fermentation medium) in 3,000 L. tank. The fermentation tank was stirred at 28° C. at 200 r.p.m. with aeration rate of 1,000 L./min. Progress of tank fermentation is shown below.

| hours | pH of broth | broth potency |
|---|---|---|
| 0 | 6.85 | — |
| 13 | 6.75 | 20 mcg./ml. |
| 16 | 6.52 | 28 |
| 19 | 6.25 | 50 |
| 22 | 6.25 | 80 |
| 25 | 6.40 | 78 |

-continued

| hours | pH of broth | broth potency |
|---|---|---|
| 28 | 6.25 | 108 |
| 31 | 5.85 | 108 |
| 34 | 5.61 | 115 |

EXAMPLE 3

Extraction of Cirramycin $B_1$

The harvested broth obtained from Example 2 was filtered with filter aid (Topco, 5% W/V), and the filter cake was washed with water. The filtrate and washings were combined (1,600 L.), adjusted to pH 8.2 and extracted twice, with a 500-L. and a 200-L. portion of n-butyl acetate. The n-butyl acetate extracts were combined and stirred successively with 43-L. and 23-L. portions of acidic cold water at pH 2.0. The aqueous layers were separated, combined, adjusted to pH 8.5, and then extracted twice with 25-L. and 15-L. portions of n-butyl acetate. The n-butyl acetate extracts were combined and again back-extracted with acidic cold water at pH 2.0 to give a final-rich aqueous extract having a total volume of about 20 L. and a potency of about 5,400 mcg. per ml.

The extract of cirramycin $B_1$ obtained above was shown by PPC and TLC to contain several other components. A part of the extract was fractionated by countercurrent distribution between benzene and M/10 Sorensen's buffer of pH 5.8 in 100 transfers. The composition of the extract is shown below.

| component | PPC* (Rf) | approx. weight ratio (from CCD) |
|---|---|---|
| $A_1$ | 0.84 | 3% |
| $A_2$ | 0.89 | |
| $A_3$ | 0.75 | |
| | | 12% |
| $A_4$ | 0.67 | |
| $A_5$ | 0.86 | |
| $B_3$ | 0.82 | |
| | | 20% |
| $B_2$ | 0.62 | |
| $B_1$ | 0.91 | 65% |

*ascending paper chromatography: N/20 NH$_4$OH saturated with MIBK

EXAMPLE 4

Conversion of Solid Cirramycin $B_1$ to Cirramycin $A_1$

Cirramycin $B_1$, 55 mg., was dissolved in 5 ml. of N/100 HCl and added with 50 ml. of 2% cane molasses solution. The mixture was incubated at 37°C. for three days and then extracted by ethyl acetate at pH 8.0 The activity was transferred to acidic water of pH 3.0 and again back-extracted to benzene at pH 8.0. The benzene extract was concentrated in vacuo and then lyophilized to give 39 mg. of white powder which was identified as cirramycin $A_1$. The potency of the solid was 920 mcg./mg/ as cirramycin $A_1$ (yield 77.5%). The following TLC system was found useful to differentiate cirramycins $A_1$ and $B_1$.

Silica gel plate, system: EtOAc-MeOH (1:1)
Rf of cirramycin $A_1$: 0.38
Rf of cirramycin $B_1$: 0.77

EXAMPLE 5

Conversion and Subsequent Purification Starting from an Aqueous Extract

A portion of the aqueous extract (3.15 L.) of cirramycin $B_1$ from Example 3, which contained 20.4 grams of cirramycin $B_1$ and 0.85 gram of $A_1$ (determined by CCD), was admixed with 420 grams of cane molasses and 18 L. of water, and stirred at 37°C. for three to four days. Periodical samplings were made to trace the progress of the conversion by TLC and bioassay, and the data is shown below.

| Time | pH | TLC* (relative zone size) | | bio-activity** |
|---|---|---|---|---|
| 0 hr. | 6.5 | $A_1$ (trace) | $B_1$ | 760 mcg./ml. |
| 24 | 5.1 | $A_1$ | $B_1$ | 780 |
| 48 | 4.9 | $A_1$ | $B_1$ | 860 |
| 72 | 4.85 | $A_1$ | $B_1$ (trace) | 1,000 |
| 96 | 4.75 | $A_1$ | | 1,050 |

*bio-autograph, silica gel plate. EtOAc-MeOH (1:1).
**agar diffusion assay. Standard: cirramycin $A_1$.

The reaction mixture, 21 L., was extracted twice with 10-L. and 8-L. portions of butyl acetate at pH 8.5. The combined extract was stirred with 3.5 L. of N/5 Sörensen's buffer of pH 5.8. Minor cirramycin components (mostly $A_5$, $B_2$, $B_3$) remained in the organic layer. The aqueous layer was separated and extracted at pH 9.0 with 3 L. of ethyl acetate. After being washed with 0.5 L. of water, the ethyl acetate extract was concentrated in vacuo to yield 28.1 grams of crude cirramycin $A_1$ (potency: 640 mcg./mg). The crude solid was purified by the preparative countercurrent apparatus (100 ml./tube) using a solvent system of benzene—M/5 phosphate buffer of pH 7.0 in 50 transfers. Tube Nos. 21 through 27 were combined, extracted by benzene at pH 8.5 and evaporated in vacuo to yield 12.2 grams of pure cirramycin $A_1$ base (potency: 1,000 mcg./mg.). Crystallization from chloroform gave colorless prisms melting at 145° C. to 148° C. which was a chloroform solvate of cirramycin $A_1$.

What is claimed is:

1. A process for the production of cirramycin $A_1$ which comprises producing cirramycin $B_1$ by cultivation of a strain of Streptomyces cirratus in an aqueous carbohydrate solution containing a nitrogenous nutrient under anerobic conditions until substantial antibiotic potency is produced in the broth, separating the cirramycin $B_1$ from said broth, and incubating the separated cirramycin $B_1$ in an aqueous substrate containing at least about 2 per cent cane molasses at a temperature sufficient to cause substantial conversion to cirramycin $A_1$ until substantial conversion results.

2. A process according to claim 1 wherein the cirramycin $B_1$ separated from the broth is added to the substrate as an aqueous extract of cirramycin $B_1$.

3. A process according to claim 1 wherein cirramycin $B_1$ is added to the substrate as solid cirramycin $B_1$.

4. A process according to claim 1 wherein the strain of Streptomyces cirratus is ATCC 21731, the incubation temperature is about 37° C., and the substrate is a 2% aqueous solution of cane molasses.

* * * * *